(No Model.)

R. SHERMAN.
REVERSIBLE TOASTER.

No. 268,047. Patented Nov. 28, 1882.

Witnesses
S. N. Piper
J. H. Hogan

Inventor.
Roger Sherman.
by R. H. Eddy att'y.

N. PETERS. Photo-Lithographer, Washington, D. C.

UNITED STATES PATENT OFFICE.

ROGER SHERMAN, OF SOMERVILLE, MASSACHUSETTS.

REVERSIBLE TOASTER.

SPECIFICATION forming part of Letters Patent No. 268,047, dated November 28, 1882.

Application filed October 10, 1882. (No model.)

*To all whom it may concern:*

Be it known that I, ROGER SHERMAN, of Somerville, in the county of Middlesex, of the State of Massachusetts, have invented a new and useful Improvement in Reversible Toasters; and I do hereby declare the same to be described in the following specification and represented in the accompanying drawings, of which—

Figure 1:
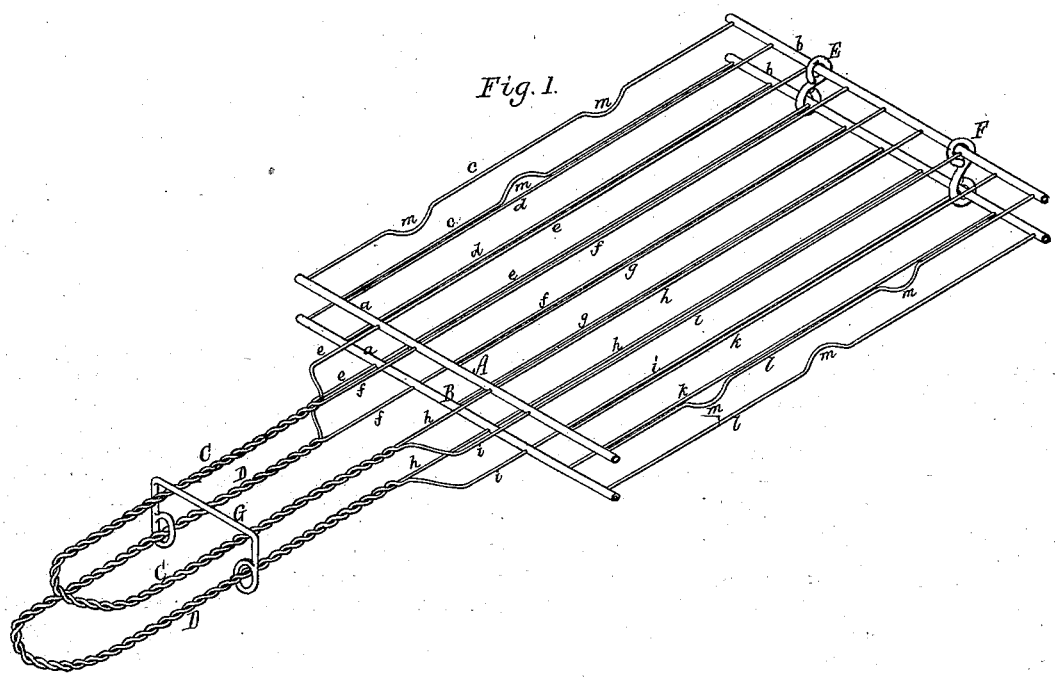

Figure 1 is a perspective view, and Fig. 2 an edge elevation, of a toaster embodying my invention, the nature of which is defined in the claim hereinafter presented.

In the said drawings, the reversible toaster is shown as composed of two grids, A B, provided with handles C D and connected by links E F, there being upon one of such handles a closing slide, G. Each grid, with exception of the two end bars, $a$ $b$, thereof, is composed of wires $c$ $d$ $e$ $f$ $g$ $h$ $i$ $k$ $l$, arranged parallel to each other, at equal distances apart, and at right angles to and connected to the said two cross-bars, which are tubular. The wires $e$ $f$ and $h$ and $i$ of each grid are extended beyond the grid and bent and twisted in manner as represented to form the handle.

Figure 2:
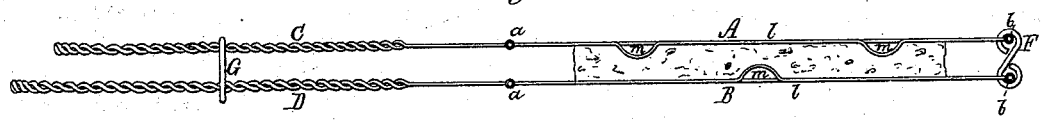

In carrying out my improvement on the toaster provided with grids, as described, I form each of the outermost wires, $c$ and $l$, with one or more arched bends, as shown at $m$, the bends of each of said wires of one grid being projected toward the opposite fellow wire of the other grid, as shown in Fig. 2. The drawings show each outermost wire of one grid as having but one arched bend $m$, which is arranged at its middle, each outermost wire of the other grid having two such bends, each of which is arranged about one-fourth the length of the wire from the next contiguous end bar of the grid. These bends are to prevent a slice of toast from falling or slipping out of the toaster while it may be in the act of being reversed, as without such devices to the toaster the slice of bread, on becoming toasted on one side, and thereby shrunk in thickness, is frequently not firmly held between and by the grids, and consequently becomes liable to fall out of the toaster while such toaster may be in the act of being reversed or turned over. The bends or projections $m$ prevent the accidental escape of the toasted bread from the toaster.

I claim as my invention—

A reversible toaster, substantially as described, having to each of its outermost grid-wires one or more projections or bends $m$, arranged essentially in manner and for te purpose as set forth.

ROGER SHERMAN.

Witnesses:
R. H. EDDY,
E. B. PRATT.